(12) United States Patent
Stevenson et al.

(10) Patent No.: US 12,488,498 B1
(45) Date of Patent: Dec. 2, 2025

(54) THERMOGRAPHY MEASUREMENTS IN HEATING PROCESS USING PSEUDOCALIBRATION OF THERMAL IMAGES

(71) Applicant: XIRIS AUTOMATION INC., Burlington (CA)

(72) Inventors: John Stevenson, Oakville (CA); Gregory Michael Cooke, Burlington (CA); Cameron Serles, Oakville (CA); Patricio F. Mendez, Edmonton (CA)

(73) Assignee: XIRIS AUTOMATION INC., Burlington (CA)

( * ) Notice: Subject to any disclaimer, the term of this patent is extended or adjusted under 35 U.S.C. 154(b) by 518 days.

(21) Appl. No.: 17/887,631

(22) Filed: Aug. 15, 2022

Related U.S. Application Data

(60) Provisional application No. 63/235,342, filed on Aug. 20, 2021.

(51) Int. Cl.
*G06K 9/00* (2022.01)
*G01J 5/48* (2022.01)
(Continued)

(52) U.S. Cl.
CPC ...... *G06T 7/74* (2017.01); *G01J 5/48* (2013.01); *G01N 25/02* (2013.01); *G06T 7/13* (2017.01);
(Continued)

(58) Field of Classification Search
CPC .... G01N 25/20; G01J 2005/0077; G01J 5/48; G01J 5/485; G06T 2207/10048;
(Continued)

(56) References Cited

U.S. PATENT DOCUMENTS

| | | |
|---|---|---|
| 4,168,430 A | 9/1979 | Denis et al. |
| 4,817,020 A | 3/1989 | Chande et al. |

(Continued)

OTHER PUBLICATIONS

Einerson, Carolyn J., et al. "Development of an intelligent system for cooling rate and fill control in GMAW"; [Gas Metal Arc Welding (GMAW)]. No. EGG-M-92381; CONF-9206173-6. Eg and G Idaho, Inc., Idaho Falls, ID (United States), 1992; 7 pgs.

(Continued)

*Primary Examiner* — Atiba O Fitzpatrick
(74) *Attorney, Agent, or Firm* — Tarolli, Sundheim, Covell & Tummino LLP

(57) ABSTRACT

A method for measuring a cooling rate of molten material uses a single thermal image of a heating process having a known pixel speed, and identifies a first pixel set having a first known temperature, a second pixel set having a second known temperature and a pixel distance between the first pixel set and the second pixel set. The method uses the first temperature, the second temperature, the known pixel speed and the pixel distance to determine the cooling rate. By detecting, in an uncalibrated thermal image of a heating process using a material, areas having specific states (specifically in the molten state and in the solidified state), and knowing the actual temperature in the solidified state (because of the known physical properties of that type of material), it is possible to determine the emissivity of the material in the solid state.

22 Claims, 11 Drawing Sheets

(51) Int. Cl.
*G01N 25/02* (2006.01)
*G06T 7/13* (2017.01)
*G06T 7/73* (2017.01)
*G06V 10/22* (2022.01)
*G06V 10/44* (2022.01)
*G06V 10/62* (2022.01)
*G01J 5/00* (2022.01)

(52) U.S. Cl.
CPC .............. *G06V 10/22* (2022.01); *G06V 10/44* (2022.01); *G06V 10/62* (2022.01); *G01J 2005/0077* (2013.01); *G06T 2207/10048* (2013.01)

(58) Field of Classification Search
CPC . G06T 7/0004–001; G06T 2207/30108; G06T 2207/30116; G06T 2207/30136; G06T 2207/30148; G06T 2207/30164; G06T 2207/30152; H04N 23/23
See application file for complete search history.

(56) References Cited

U.S. PATENT DOCUMENTS

| | | | |
|---|---|---|---|
| 4,877,940 A | 10/1989 | Bangs et al. | |
| 5,283,416 A | 2/1994 | Shirk | |
| 6,399,915 B1 | 6/2002 | Mori et al. | |
| 6,414,261 B1 | 7/2002 | Maetschke | |
| 6,459,951 B1 | 10/2002 | Griffith et al. | |
| 6,710,283 B2 | 3/2004 | Mori et al. | |
| 7,959,353 B2 | 6/2011 | Anantharaman | |
| 8,890,023 B2 | 11/2014 | Dorsch et al. | |
| 9,050,685 B2 | 6/2015 | D Angelo et al. | |
| 9,505,086 B2 | 11/2016 | Toci et al. | |
| 2003/0165180 A1 | 9/2003 | Weerasinghe et al. | |
| 2011/0085582 A1* | 4/2011 | Zagar | G01B 21/085 374/9 |
| 2013/0077650 A1* | 3/2013 | Traxler | G01N 25/72 374/5 |
| 2017/0102689 A1* | 4/2017 | Khajepour | B22F 12/20 |
| 2018/0133840 A1* | 5/2018 | Noriyama | B23K 26/342 |
| 2019/0134747 A1 | 5/2019 | Herzog et al. | |
| 2019/0184482 A1 | 6/2019 | Holverson et al. | |
| 2019/0210159 A1 | 7/2019 | Endoh et al. | |
| 2019/0255654 A1 | 8/2019 | Beckett et al. | |
| 2020/0316720 A1* | 10/2020 | Liu | G01B 11/303 |
| 2021/0096093 A1* | 4/2021 | Richter | F27B 14/20 |
| 2022/0076407 A1* | 3/2022 | Nayeri | G06T 7/0008 |
| 2023/0046023 A1* | 2/2023 | Ngo | G01N 25/72 |

OTHER PUBLICATIONS

WelderDestin; Article: "Equipping the Welder for a New Era—Welding Heat Input Essential Variable"; https://www.welderdestiny.com/welding-heat-input.html; Retrieved: May 22, 2025; 8 pgs.

* cited by examiner

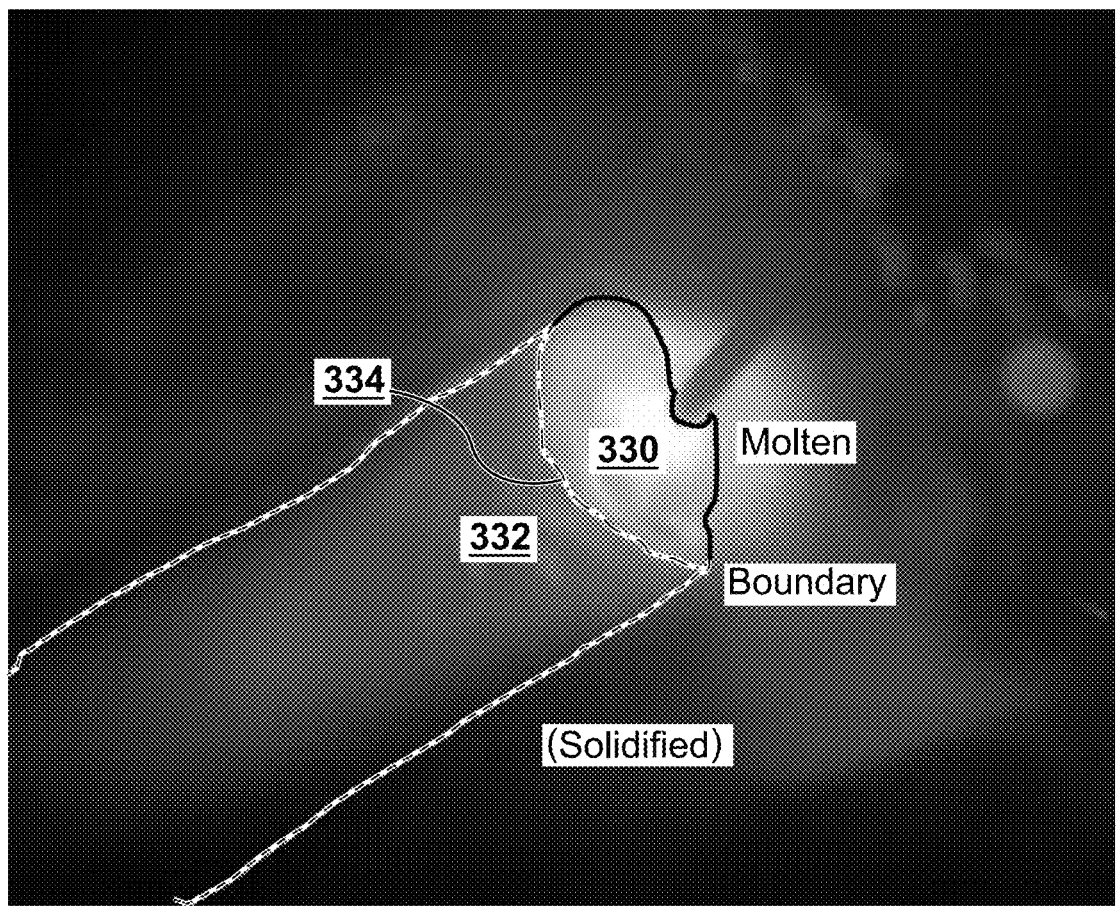
FIG. 3A
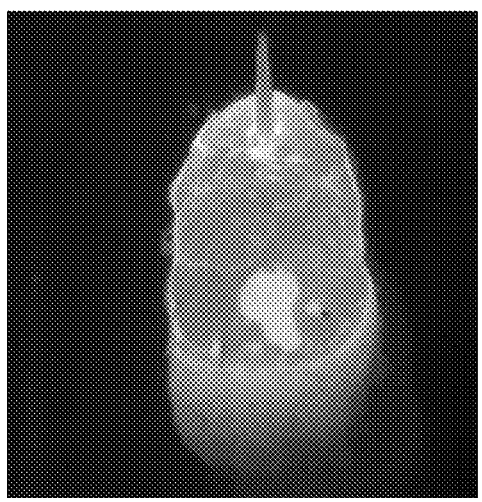 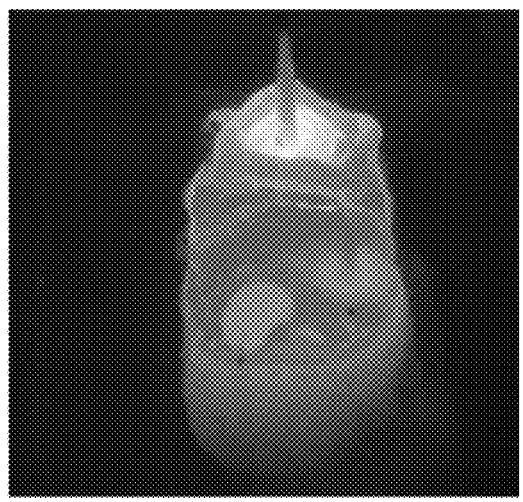
FIG. 3B            FIG. 3C

THERMOGRAPHY MEASUREMENTS IN HEATING PROCESS USING PSEUDOCALIBRATION OF THERMAL IMAGES

TECHNICAL FIELD

The present disclosure relates to thermal imaging, and more particularly to using thermal imaging to measure a cooling rate of a substrate in a heating process where the substrate is subject to heat applied by a heat tool that is moving relative to the substrate.

BACKGROUND

There is a wide range of applications in which heat is applied to a substrate by a heat tool that is moving relative to the substrate. The heat tool may be fixed and the substrate may be moved, or the heat tool may move along the substrate. One common example of such an application is welding, in which the heat tool may be a welding torch.

In welding applications, it is useful to know the cooling rate of the weld bead. The general concept of the desired measurement is notated $T_{a/b}$ which is the time for the bead to cool from temperature a to temperature b. The values of a and b are selected based on the material properties of the metal being welded. For example, $T_{8/5}$ (the time from 800° C. to 500° C.) is a commonly used measurement for welding carbon steel.

It is believed that the current state of the art is to determine the cooling rate $T_{a/b}$ using thermocouples. Another technique that has been used to determine the cooling rate $T_{a/b}$ is to use a time-series of thermal images from a thermal camera, as described in U.S. Pat. No. 10,816,491. The response of a thermal camera is due to the actual temperature of the material being imaged and also the emissivity of that material, which varies with several factors including the physical state of the material. Given a certain location in a thermal image, being viewed at a certain angle, the emissivity at that location is not an easily-known quantity. Therefore, the time-series approach generally requires a properly calibrated thermal camera. A properly calibrated thermal camera is one in which the thermal camera has been calibrated to identify a precise correspondence between pixel intensity and temperature. Such calibration is a time consuming and cumbersome process, and is often unreliable due to a variety of factors.

SUMMARY

The present disclosure describes a method for extracting, from a single thermal image, the cooling profile of a substrate in a heating process in which the substrate is subject to heat applied by a heat tool that is moving relative to the substrate, and also describes a pseudocalibration technique that can be applied to a thermal image (as opposed to direct calibration of a thermal camera).

In one aspect, the present disclosure describes a method for measuring a cooling rate of a substrate in a heating process where the substrate is subject to heat applied by a heat tool that is moving relative to the substrate comprises. The method comprises obtaining a single thermal image of the substrate. The substrate has a known pixel speed relative to the heat tool. The method further comprises identifying, within the single thermal image, a first pixel set having a first pixel intensity associated with a first temperature $T_1$, a second pixel set having a second pixel intensity associated with a second temperature $T_2$, and a pixel distance between the first pixel set and the second pixel set. The first temperature $T_1$ is known from the first pixel intensity and the second temperature $T_2$ is known from the second pixel intensity. The method uses the first temperature $T_1$, the second temperature $T_2$, the known pixel speed and the pixel distance between the first pixel set and the second pixel set in the single thermal image to determine the cooling rate.

In some embodiments, the cooling rate is determined independently of knowledge of actual speed of movement of the substrate relative to the heat tool.

In some embodiments, the heating process is a welding process and the heat tool is a welding torch.

In some embodiments, the known pixel speed is determined by obtaining a time series of thermal image frames of the substrate, where each of the thermal image frames has a known time position in the time series, detecting a feature in an earlier one of the thermal image frames, detecting the feature in a later one of the thermal image frames, determining a travel distance for the feature, measured in pixels, between the earlier one of the thermal image frames and the later one of the thermal image frames, and using the known time position of the earlier one of the thermal image frames, the known time position of the later one of the thermal image frames, and the travel distance to determine the pixel speed. In particular embodiments, the time series has a known frame rate and the known time position of the earlier one of the thermal image frames and the known time position of the later one of the image frames are determined from the frame rate and a frame difference between the earlier one of the thermal image frames and the later one of the image frames. In such embodiments, the frame rate may be a constant frame rate.

In some embodiments, a timestamp is associated with each of the thermal image frames, and the known time position of the earlier one of the thermal image frames and the known time position of the later one of the image frames are determined from the respective timestamps associated with each of the earlier one of the thermal image frames and the later one of the image frames.

The method may further comprise applying thermal calibration to the single thermal image.

In some embodiments, the thermal calibration applied to the single thermal image is determined by, for at least one reference thermal image of a same material as depicted in the thermal image of the substrate and including a melt pool of the material and a proximal solidified region of the material, where the at least one reference thermal image is obtained by a same thermal camera as obtained the single thermal image, identifying the melt pool containing molten material pixels, and identifying at least a solidified boundary pixel set, where the solidified boundary pixel set contains solidified material pixels that are proximal to and outside of the melt pool. The material has a definite solidus temperature, and the definite solidus temperature is assigned to a subset of the solidified boundary pixel set. The solidified boundary pixel set having the definite solidus temperature assigned thereto is used determine a calculated solid material emissivity, and the calculated solid material emissivity is used to calculate temperature values of the solidified material pixels.

In some embodiments, the definite solidus temperature is determined thermodynamically. In some embodiments, the definite solidus temperature is a kinetically adjusted solidus temperature.

The method may further comprise, for the reference thermal image(s), where the material has a definite liquidus temperature, assigning the definite liquidus temperature to a subset of the molten material pixels. The method then further comprises using the subset of the molten material pixels having the definite liquidus temperature assigned thereto to determine a calculated molten material emissivity, and further using the calculated molten material emissivity to calculate temperature values of the molten material pixels.

In some embodiments, the at least one reference thermal image is a time series of thermal image frames, and identifying the melt pool comprises detecting a plurality of fluctuating pixels where the fluctuating pixels fluctuate between higher and lower apparent thermal values over the time series, determining a boundary subsuming a threshold spatial density of the fluctuating pixels, and setting the boundary as a melt pool boundary containing the melt pool.

In certain embodiments, determining the boundary comprises applying a brightness threshold to the fluctuating pixels and excluding those of the fluctuating pixels that fail to satisfy the brightness threshold.

In some embodiments, the material is an alloy and the solidus temperature and the liquidus temperature are different. In other embodiments, the material is a pure metal and the solidus temperature and the liquidus temperature are subsumed in a single melting point.

In yet another aspect, a method for thermal image pseudo-calibration comprises detecting, in at least one thermal image of a material having a definite solidus temperature, a molten region of the thermal image(s) where the material is in a molten state and a solidified region of the thermal image(s) wherein the material is in a solid state. The method further comprises assigning the definite solidus temperature to a first set of pixels that are proximal to the molten region and disposed within the solidified region, using the first set of pixels having the definite solidus temperature assigned thereto to determine a calculated solid material emissivity for the at least one thermal image, and using the calculated solid material emissivity to obtain a thermal calibration.

In some embodiments, where the material has a definite liquidus temperature, the method further comprises assigning the definite liquidus temperature to a second set of pixels that are disposed within the molten region and using the second set of pixels having the definite liquidus temperature assigned thereto to determine a calculated molten material emissivity for the at least one thermal image.

In some embodiments, the material is an alloy and the solidus temperature and the liquidus temperature are different. In other embodiments, the material is a pure metal and the solidus temperature and the liquidus temperature are subsumed in a single melting point.

BRIEF DESCRIPTION OF THE DRAWINGS

These and other features will become more apparent from the following description in which reference is made to the appended drawings wherein:

FIG. 3A shows an illustrative reference thermal image with a melt pool, an adjacent solidified region and a boundary between the melt pool and the solidified region identified;

FIGS. 3B and 3C show two illustrative reference thermal images from the same welding process, taken at two different times, showing how pixel intensities within a thermal image of a welding process vary over time;

DETAILED DESCRIPTION

As noted above, a properly calibrated thermal camera is one that has been calibrated to identify a precise correspondence between pixel intensity and temperature. As used herein, the term "uncalibrated" when applied to a thermal camera means that the thermal camera has not been calibrated to identify a precise correspondence between pixel intensity and temperature. Nonetheless, such an "uncalibrated" camera will still have undergone sufficient adjustment so as to be consistent in that equal thermal radiance will generate pixels of equal intensity over the expected temperature range, even if the precise correspondence to temperature is not known. The term "pseudocalibration" refers to thermal calibration applied to a thermal image, independent of the camera that captured the image, and which permits use of an uncalibrated thermal camera to obtain temperatures from the pixel intensities of image captured by that thermal camera.

The present disclosure describes a method for extracting, from a single thermal image, the cooling profile of a substrate in a heating process in which the substrate is subject to heat applied by a heat tool that is moving relative to the substrate. The term "substrate", as used herein, refers to the material that is being heated by the heating tool. Thus, the substrate may be a base material, or may be a deposition onto a base material or onto one or more underlying layers atop a base material. As noted above, one example of a heating process is welding, and welding will be used as an example for purposes of illustration. The terms "weld" and "welding", as used herein, are used in the broadest sense, and include, without limitation, brazing, cladding (including laser cladding) and any suitable process described in Annex A of AWS A3.0M/A3.0:2010, *Standard Welding Terms and Definitions Including Terms for Adhesive Bonding, Brazing, Soldering, Thermal Cutting, and Thermal Spraying* published by the American Welding Society, which is hereby incorporated by reference. However, while welding is used as an illustrative example, it is to be understood that the heating processes in respect of which aspects of the present invention may be applied are not limited to welding. Other examples of heating processes in respect of which aspects of the present invention may be applied include, without limitation, heat treatment (e.g. annealing) and additive manufacturing. The present disclosure also describes a method for calibrating a thermal image from an uncalibrated thermal camera, that is, the use of "pseudocalibration" applied to the image, without the need to precisely calibrate the thermal camera to have the correct value for each pixel intensity.

Figure 1:
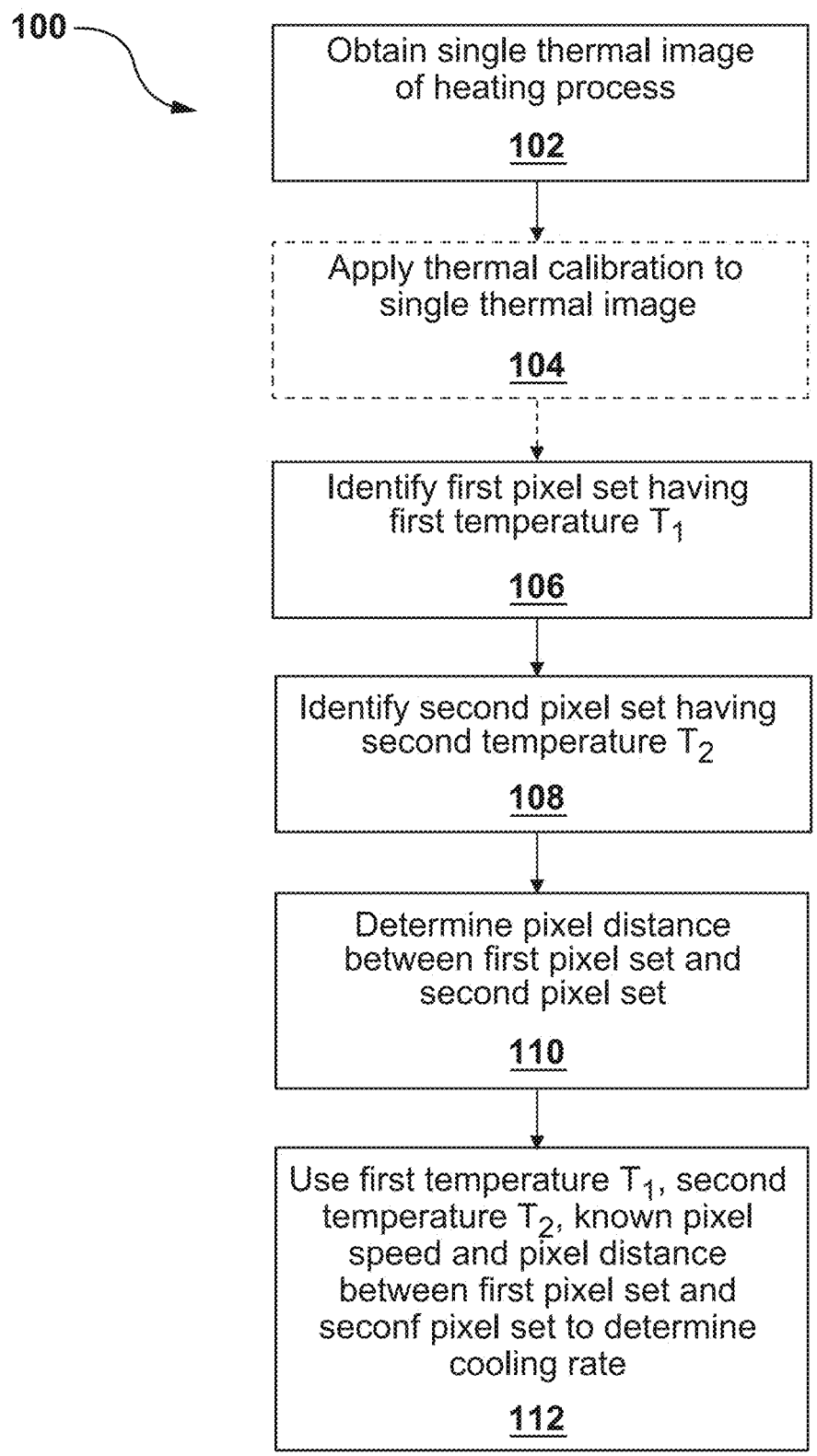
FIG. 1 is a flow chart which shows an illustrative method for measuring a cooling rate of molten material in a heating process.

FIG. 1 is a flow chart which shows an illustrative method 100 for measuring a cooling rate of molten material in a heating process. The heating process is one that has a known pixel speed. A "pixel speed" is a speed of the heating process, that is, the speed of the substrate relative to the heat tool, measured in pixels per unit time (e.g. pixels per second). An important feature of the use of pixel speed in the method 100 is that the actual "real world" speed of the heating process does not need to be known and the method 100 can be applied in the absence of any knowledge of the real world speed of the heating process (e.g. inches or centimeters per second). Thus, the method 100 may determine the cooling rate independently of knowledge of actual speed of movement of the substrate relative to the heat tool. The pixel speed can be determined in a number of ways; one exemplary method is discussed further below. The use of pixel speed rather than actual speed is advantageous because it avoids the need for geometric calculations associated with calculating actual speeds. In some embodiments, the heating process may be a welding process in which the heat tool is a welding torch, although the method 100 may be applied in respect of any suitable heating process.

At step 102, a single thermal image of the heating process is obtained, for example from a thermal camera. At optional step 104, thermal calibration is applied to the single thermal image, for example using a pseudocalibration technique described further below. Alternatively, the thermal image received at step 102 may already be calibrated, either by coming from a calibrated thermal camera, or having previously been subjected to pseudocalibration, or otherwise. At step 106, the method 100 identifies, within the single thermal image, a first pixel set having a first pixel intensity associated with a first temperature $T_1$ and at step 108, the method 100 identifies, within the single thermal image, a second pixel set having a second pixel intensity associated with a second temperature $T_2$ where $T_1 > T_2$. The first temperature $T_1$ is known from the first pixel intensity and the second temperature $T_2$ is known from the second pixel intensity. Thus, the temperatures $T_1$ and $T_2$ are determined based on pixel intensity; an illustrative pseudocalibration process for this purpose is described further below. The first pixel sets and the second pixel sets may each be a set consisting of a single pixel, or a plurality of pixels. Where the pixel sets comprise a plurality of pixels, for example adjacent pixels, the pixel intensities used to determine the temperatures $T_1$ and $T_2$ may be determined, for example, by taking an average of the pixel intensities in each set to determine the temperatures (e.g. a simple average or a weighted average). Although FIG. 1 shows steps 106 and 108 proceeding in sequence, they may proceed in reverse order or substantially simultaneously.

At step 110, the method 100 determines a pixel distance, that is, a distance measured, in pixels, along some arbitrary path between the first pixel set and the second pixel set. Notably, the path used to measure the pixel distance need not be a linear path.

Note that equivalently, optional step 104 may take place after any of steps 106, 108 or 110 and the results used to obtain the values for the temperatures $T_1$ and $T_2$ of the first pixel set and the second pixel set, respectively.

At step 112, the method 100 uses the first temperature $T_1$, the second temperature $T_2$, the known pixel speed and the pixel distance between the first pixel set and the second pixel set in the single thermal image to determine the cooling rate.

Figure 1A:
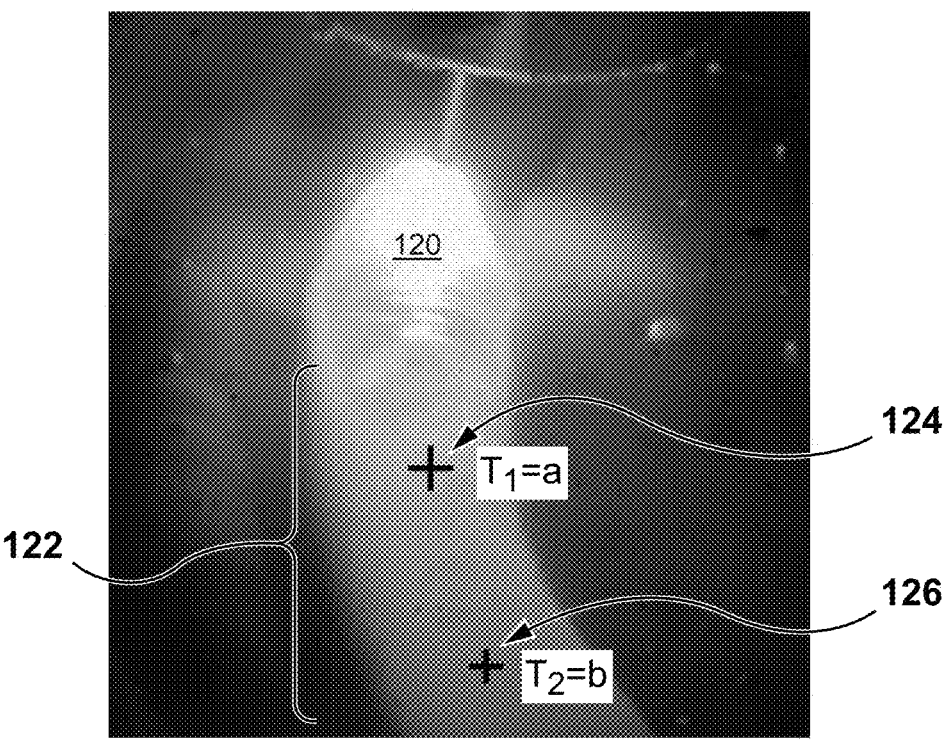
FIG. 1A is an illustrative thermal image of a weld bead.
Figure 1B:
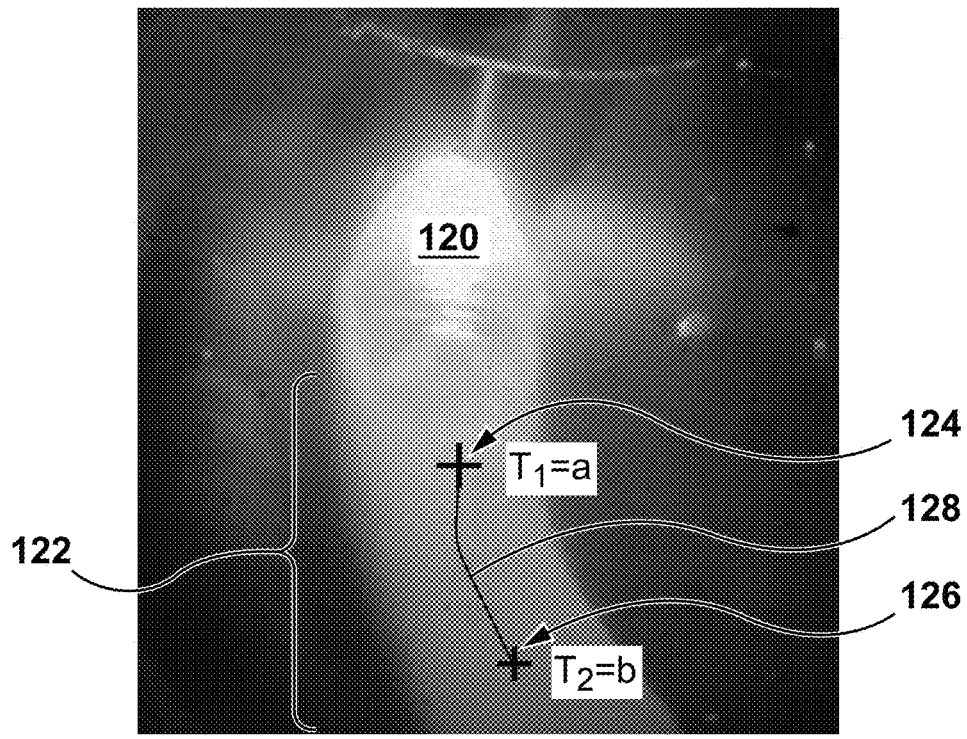
FIG. 1B shows the thermal image of FIG. 1A with an illustrative path between two pixel sets.

As noted above, where the heating process is a welding process, the desired measurement is notated $T_{a/b}$ which is the time for the bead to cool from temperature $T_1 = a$ to temperature $T_2 = b$, with the values of a and b selected based on the material properties of the metal being welded. In further illustration of the method 100, reference is now made to FIG. 1A, which is an illustrative thermal image of a welding process including a melt pool 120 and a weld bead 122. In FIG. 1A, within the image two pixel sets, which may be individual pixels (points) or groups of pixels, are marked within the weld bead 122 and denoted by references 124 and 126. These correspond to the first and second pixel sets identified at steps 106 and 108, respectively, of the method 100. In a correctly calibrated or pseudocalibrated thermal image, the respective temperatures $T_1$ and $T_2$ of the pixel sets 124 and 126 in the weld bead are known (or can be determined) from the pixel intensity. By constructing a path between the pixel sets 124 and 126, representing the displacement in space, measured along the weld bead 122, the distance corresponding to the specific temperature difference between can be determined. An illustrative path along the weld bead 122 is denoted by reference 128 in FIG. 1B. Let $L_{ab}$ represent the length of the path 128 between the two pixel sets 124 and 126, with $L_{ab}$ measured in pixels. One can compute $T_{a/b} = L_{a/b}/v$, where v is the pixel speed along the arbitrary path between the pixel sets, that is, the velocity of the system in pixels per unit time. This computation can be done for a single thermal image where the pixel speed is known, without needing to observe the actual speed of the heating process in mm/second or other similar units (which require additional technologies such as encoders). However, $L_{ab}$ can be related to $T_{a/b}$ for a single thermal image only if the pixel speed is known.

Figure 2:
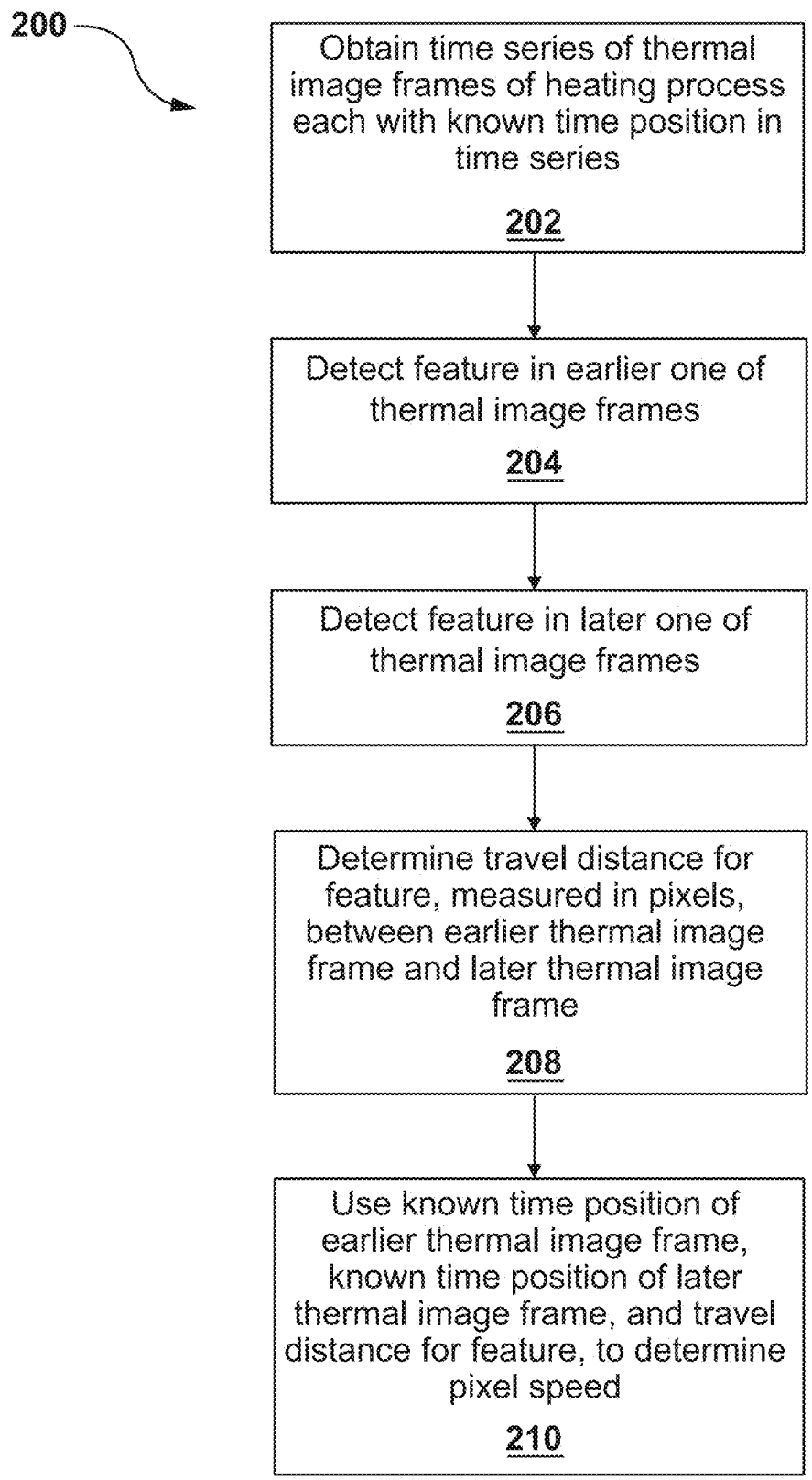
FIG. 2 is a flow chart which shows an illustrative method for determining a pixel speed.

As noted above, the pixel speed can be determined in a number of ways. One such technique is illustrated in flow chart form in FIG. 2, which depicts an illustrative method 200 for determining a pixel speed.

At step 202, the method 200 obtains a time series of thermal image frames of the heating process, with each of the thermal image frames having a known time position in the time series. For example, the time series may have a known frame rate, which may be a constant frame rate or a non-constant frame rate, or a timestamp may be associated with each of the thermal image frames, for example in image metadata.

At step 204, the method 200 detects a feature in an earlier one of the thermal image frames, and at step 206, the method 200 detects the same feature in a later one of the thermal image frames. For example, the method 200 may track the feature through the time series of thermal image frames. Steps 204 and 206 may be performed in reverse order, or substantially simultaneously.

At step 208, the method 200 determines a travel distance for the feature, measured in pixels, between the earlier one of the thermal image frames and the later one of the image frames.

At step 210, the method 200 uses the known time position of the earlier one of the thermal image frames, the known time position of the later one of the thermal image frames, and the travel distance for the feature, to determine the pixel speed.

Where the time series has a known frame rate, the known time position of the earlier one of the thermal image frames and the known time position of the later one of the image frames may be determined from the frame rate and the frame difference between the earlier one of the thermal image frames and the later one of the image frames. Where a timestamp is associated with each of the thermal image frames, the known time position of the earlier one of the thermal image frames and the known time position of the later one of the image frames may be determined from the respective timestamps associated with each of the earlier one of the thermal image frames and the later one of the image frames.

A number of well documented techniques are available to extract motion from a time series of images; these can be applied to the time series of thermal image frames in the context of the method 200 shown in FIG. 1. These techniques are generally referred to as optical flow or motion estimation and have evolved primarily from the field of time-based video encoding. One example, implemented in Open Source Computer Vision (OpenCV) is available at https://docs.opencv.org/3.4/d4/dee/tutorial_optical flow.html, the teachings of which are hereby incorporated by reference.

Typically, the outcome of optical flow analysis or motion estimation is an array of vectors describing the direction and magnitude of motion of identified pixels in the image. Since the only source of motion in the heating process scene is that of the substrate with respect to the heat tool (e.g. the material being welded relative to the welding torch), a statistical analysis of these vectors can provide a sufficiently accurate measurement of the speed of motion. So long as the speed is relatively stable within the length of the cooling process, a pixel speed for the heating process can be obtained.

In one embodiment, the method 100 can be carried out with a single thermal image from a properly calibrated thermal camera. The method 100 can also be carried out using an image from an uncalibrated thermal camera where the image has been subjected to thermal calibration, for example pseudocalibration as described below.

Figure 3:
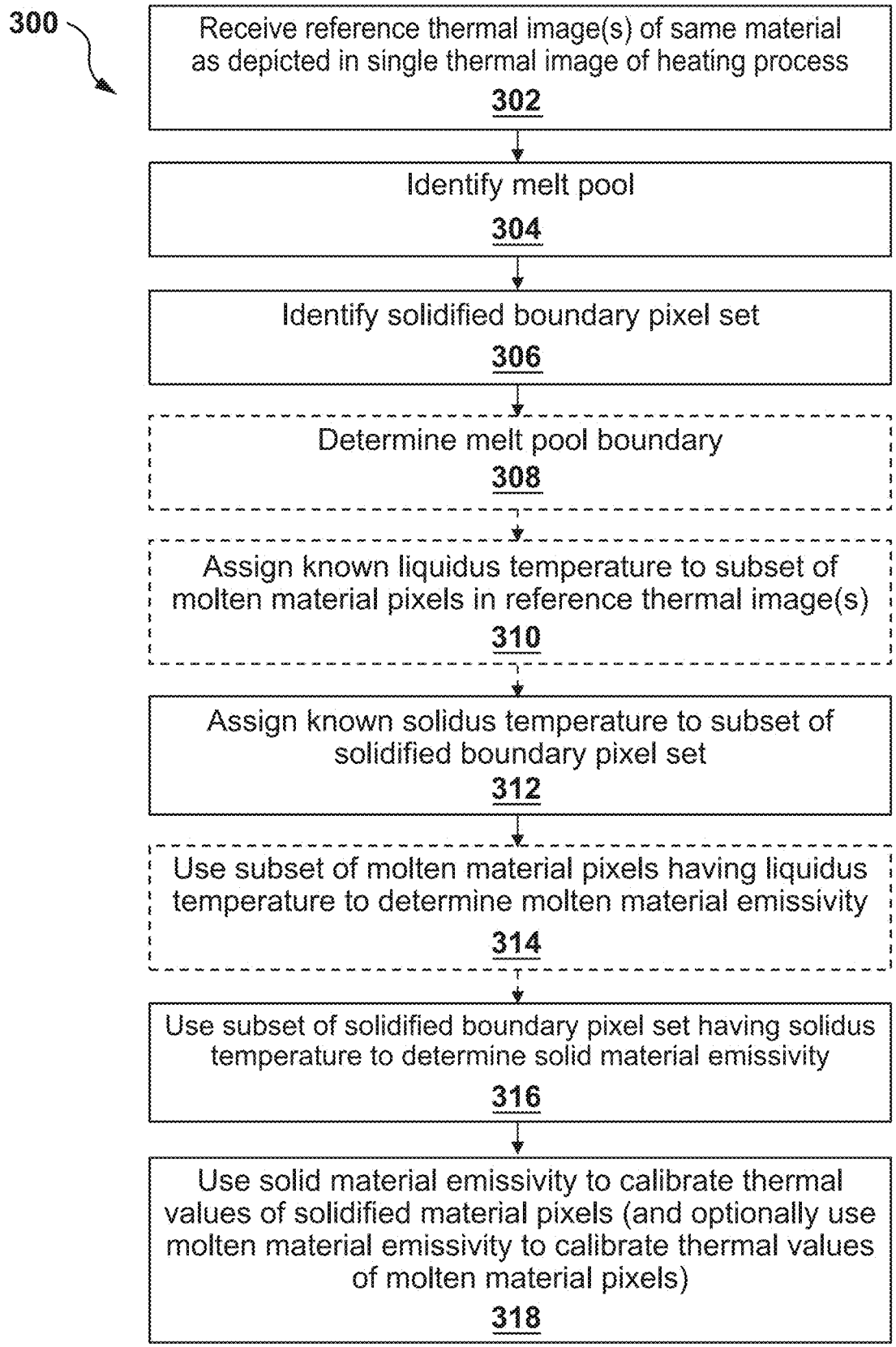
FIG. 3 is a flow chart which shows an illustrative method for determining the thermal calibration to be applied to a single image.

Reference is now made to FIG. 3, which is a flow chart showing an illustrative method, denoted by reference 300, for determining the thermal calibration to be applied to the single image (e.g. at step 102 of the method 100). Notably, and in fact critically, the method 300 determines a thermal calibration to be applied to an individual thermal image, rather than to a thermal camera; in fact, the method 300 obviates the need to directly calibrate the thermal camera.

At step 302, the method receives one or more reference thermal images of the same substrate material as depicted in the single thermal image of the heating process. This substrate material is known, and therefore has a definite solidus temperature and a definite liquidus temperature, which may be obtained, for example, from a suitable material reference table. Thus, the definite solidus temperature and definite liquidus temperature need not have perfect scientific exactitude; each may be an estimate, such as may be determined empirically, so long as the estimate is sufficiently accurate. Where the substrate material is an alloy, the solidus temperature and the liquidus temperature are different; where the substrate material is a pure metal the solidus temperature and the liquidus temperature are subsumed in a single melting point. In other words, a pure metal may be considered to have identical solidus temperature and liquidus temperature corresponding to the single melting point. It is noted here that the methods of the present disclosure are not limited to metals, and may be applied in respect of other suitable materials, such as plastics/polymers.

The reference thermal image(s) are obtained by the same thermal camera that obtained, or that will later obtain, the single thermal image at step 102 of the method 100 described above. Preferably, the method 300 receives a plurality of such reference thermal images at step 302, more preferably in the form of a time series. As shown in FIG. 3A, where the heating process is a welding process, the reference thermal image(s) include a melt pool 330 of the substrate material and a proximal solidified region 332 of the substrate material, with a boundary 334 between the melt pool 330 and the solidified region 332. FIGS. 3B and 3C show two illustrative reference thermal images from the same welding process, taken at two different times, showing how pixel intensities within a thermal image of a welding process vary over time (note that FIGS. 3B and 3C show a different welding process than that in FIG. 3A).

A thermal image of a welding process can be considered to contain at least four sets of pixels:

Set M being those pixels representing the melt pool (molten material pixels);

Set S being those pixels representing the solidified weld bead (solidified material pixels);

Set B being the background pixels (material that is not part of the melt pool or solidified weld bead); and Set W being the welding wire and/or electrode.

There may be additional pixel types, such as spatter, fumes, etc. that may be considered in sophisticated applications of the techniques disclosed herein but the above sets of pixels are sufficient to put the techniques into practice (e.g. spatter and fume pixels may be treated as background pixels).

At step 304, the method 300 identifies the melt pool and, at step 306 the method 300 identifies a solidified boundary pixel set. The melt pool contains the molten material pixels M and the solidified boundary pixel set contains solidified material pixels S that are proximal to and outside of the melt pool. The term "proximal", as used in this context, means that solidified material pixels S are close enough to the melt pool that they can be considered to be at or only slightly different from the solidus temperature of the material. In one embodiment, "proximal" pixels within the solidified material pixels S are those solidified material pixels S that are immediately adjacent to molten material pixels M on the trailing edge of the melt pool, measured in the direction of weld bead, as well as a predetermined number of additional solidified material pixels S extending in the trailing direction from the melt pool, where the predetermined number is determined based on a proportion of a dimension of the melt pool. For example, in one preferred embodiment the predetermined number is determined based on a proportion of the area of the melt pool, where the solidified material pixels S extending within an area extending substantially uniformly in the trailing direction from the trailing edge of the melt pool are considered "proximal". In such an embodiment, preferably the area extending in the trailing direction from the melt pool (beyond those solidified material pixels S immediately adjacent thereto) is an area equal to five times the number of pixels making up the area of the melt pool, more preferably three times the number of pixels making up the area of the melt pool, and still more preferably two times the number of pixels making up the area of the melt pool. In another preferred embodiment, the predetermined number is determined based on a proportion of the length of the melt pool, measured along the direction of motion of the heat tool. In such an embodiment, preferably, the number of solidified material pixels S extending in the trailing direction from the melt pool (beyond those immediately adjacent thereto) that are considered "proximal" is a number of pixels equal to five times the length of the melt pool (measured in pixels), more preferably three times the length of the melt pool, and still more preferably two times the length of the melt pool. Other suitable measures of proximity may also be used. For example, a user may specify a proximity, or a proximity may be determined based on the material, for example using a lookup table.

At optional step 308 the method 300 determines a melt pool boundary surrounding the melt pool. Step 308 is optional because in some instances identification of the melt pool may sufficiently inherently identify the melt pool boundary, such as where the boundary is distinct, whereas in other instances, the melt pool boundary may be a melt pool boundary region containing pixels representing both melted and solid material. In the latter case, it will be advantageous to know the extent of the melt pool boundary region as the solidified boundary pixel set should exclude pixels in the melt pool boundary region. For example, because an alloy may not have a distinct melting point, the melt pool boundary may be a melt pool boundary region containing pixels representing both molten and solid material.

Figure 4:
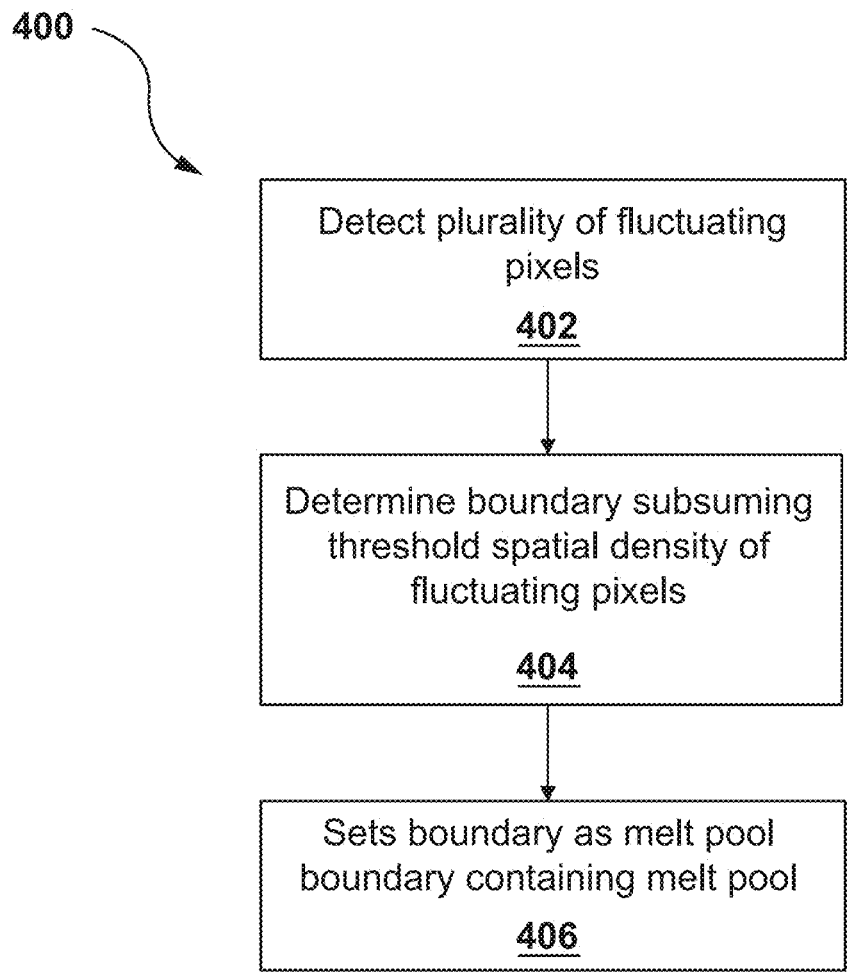
FIG. 4 is a flow chart which shows an illustrative method for identifying a melt pool in a thermal image of a heating process.

An illustrative implementation of step 304 will now be described with reference to FIG. 4, which is a flow chart showing an illustrative method 400 for identifying a melt pool in a thermal image of a heating process. In the illustrated method 400 shown in FIG. 4, the method 300 has received a time series of thermal image frames at step 302.

Figure 4A:
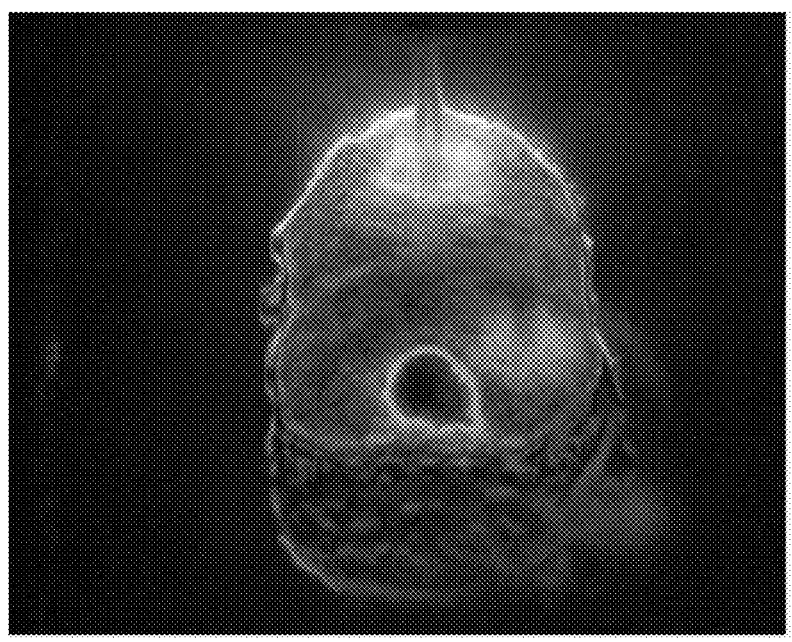
FIG. 4A is a map derived for a time series of thermal images of a welding process in which each pixel represents the Median Absolute Deviation metric of variance.

Due to various physical factors, within a time series of thermal image frames the pixels within a melt pool will vary in intensity (fluctuate) over time more than those outside of the melt pool (see for example FIGS. 3B and 3C). By analyzing the time-series of these image frames, it is possible to discriminate between high variance pixels and low variance pixels. This is represented graphically in FIG. 4A, which is a variance map for a time series of images of a welding process (note that this is a different welding process than that shown in FIG. 3A and in FIGS. 3B and 3C). In FIG. 4A, each pixel represents the Median Absolute Deviation metric of variance; other metrics could also be used such as standard deviation or range. A brighter pixel indicates more variance than a dark pixel.

Thus, at step 402, the method 400 detects a plurality of fluctuating pixels; these are pixels that fluctuate between higher and lower apparent thermal values over the time series. These pixels are likely to be disposed within the melt pool. It is important to note here that "fluctuating" pixels, that is, those that repeatedly fluctuate between higher and lower apparent thermal values over the time series, are to be distinguished from substantially monotonically changing pixels, which gradually decrease or increase in apparent thermal value without significant fluctuation.

At step 404, the method 400 determines a boundary subsuming a threshold spatial density of the fluctuating pixels. One illustrative implementation of step 404 is shown schematically in FIGS. 4B through 4E, simplified with representative image frames of 3×4 pixels for purposes of illustration. In practice, each thermal image would each contain at least thousands, and more typically hundreds of thousands, of individual pixels.

Figure 4B:
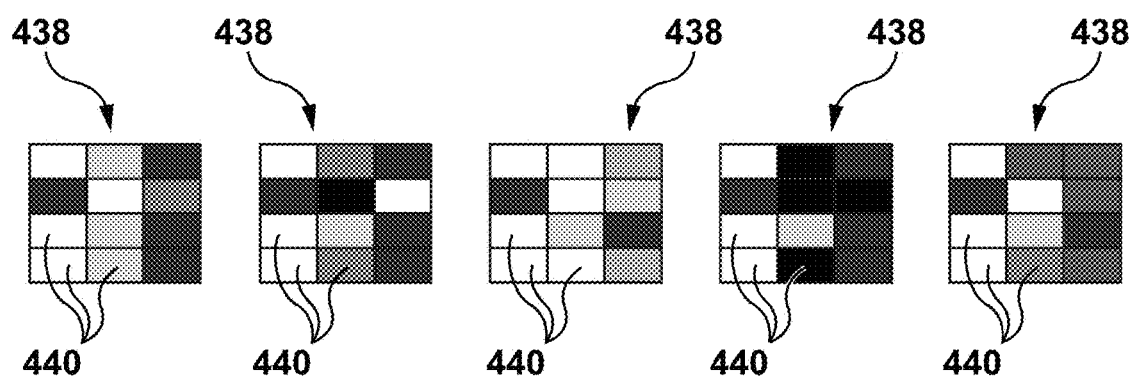
FIGS. 4B through 4E show, in simplified schematic form, a method for determining a boundary subsuming a threshold spatial density of fluctuating pixels.
Figures 4C, 4D, 4E:
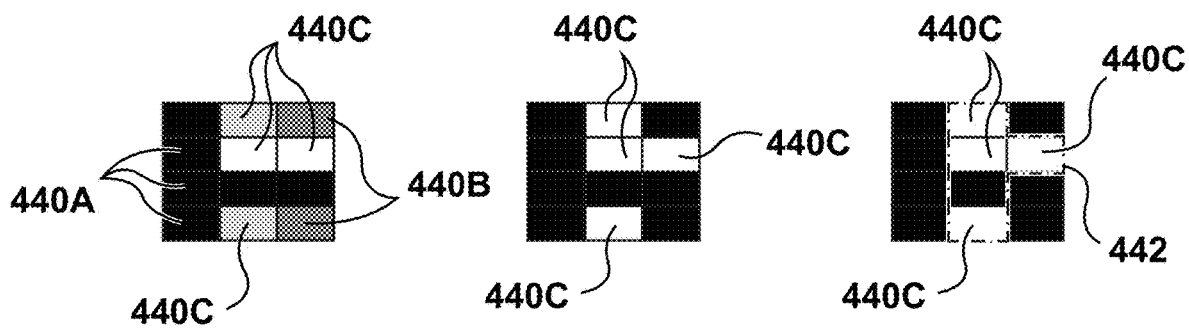

FIG. 4B shows an illustrative time series of five sequential thermal image frames 438, in which the individual pixels 440 can be seen to vary in intensity (white being high intensity and black being low intensity) over the time series. FIG. 4C is a map of the time series in FIG. 4B, showing pixel intensity proportional to pixel variation over time; FIG. 4C is conceptually similar to FIG. 4A but for the simplified 3×4 pixel images of FIG. 4B and shows intra-pixel variance. In FIG. 4C, there are low variance (black) pixels 440A, moderate variance (grey) pixels 440B and high variance (white) pixels 440C. FIG. 4D shows the result when the map in FIG. 4C is subjected to a variance threshold, which excludes the moderate variance pixels 440B and leaves only the high variance pixels 440C as fluctuating pixels 440C.

Grouping high-variance pixels together using directional connectivity analysis or other known techniques will result in a set of pixels V which is a wholly-contained subset of the set of molten material pixels M. Given this set V, blob, contour, or other analysis methods can be used to extrapolate a sufficiently accurate boundary of the set M of molten material pixels. FIG. 4E shows the boundary 442 subsuming a threshold spatial density of the fluctuating pixels 440C. Note that although the illustrative boundary 442 defines a closed shape, this is merely one illustration and the boundary does not need to have a closed shape.

Figure 4F:
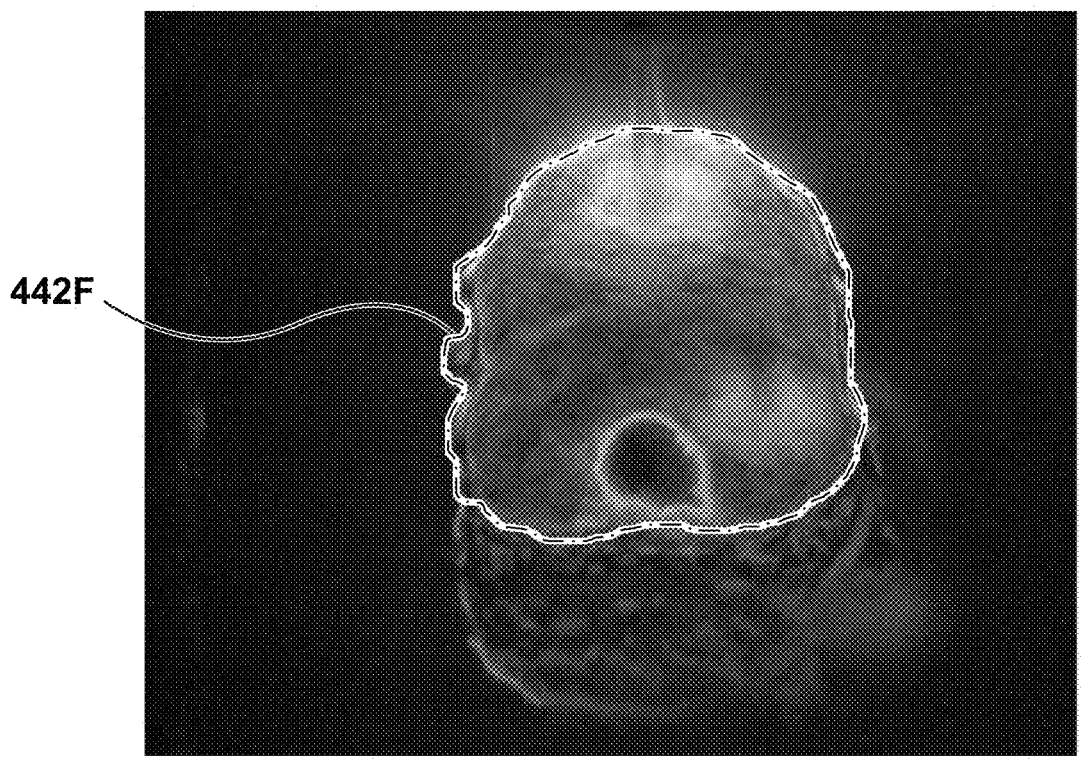
FIG. 4F shows a melt pool boundary determined for the map shown in FIG. 4A.

Returning to FIG. 4, at step 406, the method 400 sets the boundary (e.g. boundary 442) as a melt pool boundary containing the melt pool. FIG. 4F shows a melt pool boundary 442F determined for the variance map shown in FIG. 4A.

Fluctuating pixels may be molten material pixels or surface contaminant pixels (representing surface contaminants such as silicates). Thus, the molten material pixels M can be further classified as being pure metal (or alloy) pixels $M_m$, or as being silicates or other impurities, that is, impurity pixels Ms. This is part of the reason for the variations observed in this area of the image. Thresholding and/or spatial correlation techniques may be used to identify the pixels in the $M_m$ set; these pixels will have low variance and close to median intensity level.

Alternatively, where the number of molten surface contaminant pixels is expected to be small compared to the number of molten material pixels, the method may proceed without discriminating between types of molten pixels. Thus, in some embodiments, determining the boundary at step 404 comprises applying a brightness threshold to the fluctuating pixels and excluding those of the fluctuating pixels that fail to satisfy the brightness threshold.

The solidified material pixels S can be distinguished from the background pixels B using knowledge of the path of the heat tool relative to the substrate (e.g. the weld path in the case of a welding process).

Returning now to FIG. 3, as noted above the substrate material has a definite solidus temperature and a definite liquidus temperature; for an alloy the liquidus and solidus temperatures are different from one another. A pure metal has a single melting point, for purposes of construction, the single melting point can be conceptualized as a special case where the solidus and the liquidus are the same and are subsumed in that single melting point. At optional step 310, the method 300 assigns the definite liquidus temperature to a subset of the molten material pixels in at least one of the reference thermal images. The subset may be the entire set of molten material pixels, but preferably the subset is molten material pixels that are relatively close to the solidified boundary pixel set. Where step 310 is performed, the subset of the molten material pixels, which are known to be within to the melt pool, are considered to have the liquidus temperature, which may be used in correlation of temperature to intensity as described further below. At step 312, the method 300 assigns the definite solidus temperature to a subset of the solidified boundary pixel set (again, this may be the entire set, or a smaller subset). As a result of step 312, the pixels in the solidified boundary pixel set, which are known to be adjacent to the melt pool, are considered to have the solidus temperature, which will enable correlation of temperature to intensity as described further below. Steps 310 and 312 may be performed in reverse order or substantially simultaneously; where the material is a pure metal with a single melting point, steps 310 and 312 may be combined for purposes of computation by assigning the melting point to both the subset of the molten material pixels and the subset of the solidified boundary pixel set. Step 310 is optional because it is part of the process for determining the emissivity $e_m$ for the material in the molten state, which, while beneficial in some contexts, is not required in order to provide thermal calibration for obtaining a cooling profile.

Figure 3D:
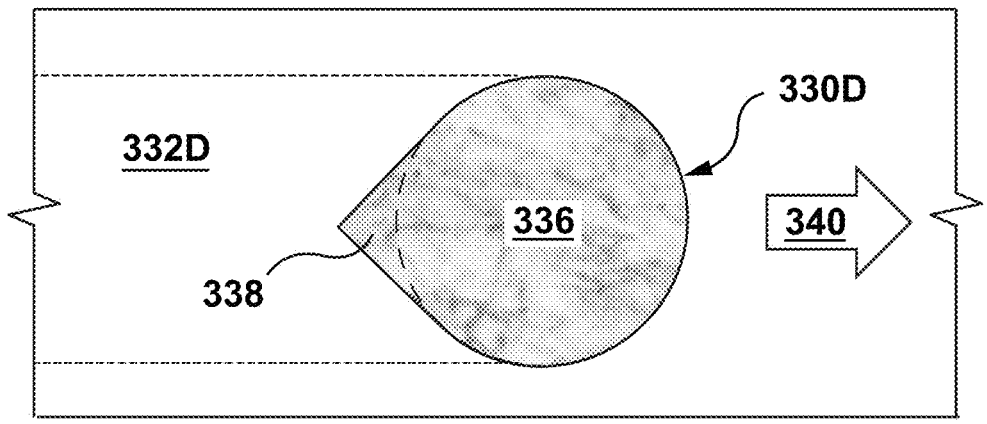
FIGS. 3D and 3E show a "fast" weld conceptually separated into a thermodynamically determined region and a kinetically determined region.
Figure 3E:
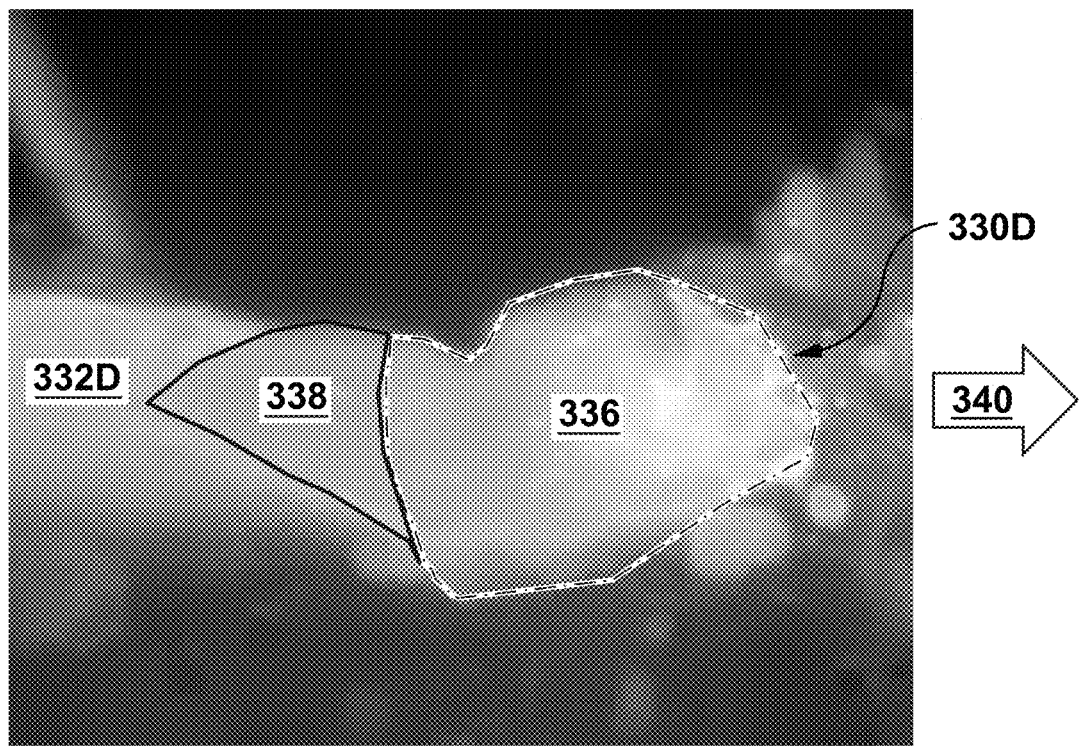

As shown schematically in FIG. 3D and photographically in FIG. 3E, in cases where the weld (or other heating process) is "fast", relative to the cooling rate of the material, the melt pool 330D will assume a spatulate or teardrop shape, which may be conceptualized as including a leading oval or egg-shaped portion 336 and a trailing generally chevron-shaped portion 338, relative to the direction of motion (arrow 340) of the heat tool (relative to the substrate). The solidified region 332D will include pixels that are proximal to the leading oval or egg-shaped portion 336 as well as pixels that are proximal to the trailing generally chevron-shaped portion 338. Notably, while the temperature within the oval or egg-shaped portion is influenced primarily by thermodynamic factors, the temperature within the chevron-shaped portion is significantly affected by kinetic factors, and will typically be different than that of the oval or "egg-shaped" portion. Accordingly, it is preferable for the solidified boundary pixel set to be proximal to only the chevron-shaped portion 338, or only the oval or egg-shaped portion 336. Where the solidified boundary pixel set is proximal to only the chevron-shaped portion 338, the assigned definite solidus temperature may be a kinetically adjusted solidus temperature, and when the solidified boundary pixel set is proximal to only the oval or egg-shaped portion 336, the definite solidus temperature may be determined thermodynamically.

Using a grey body model, in which the total radiation emitted at a given temperature is related to the total radiation emitted by a black body at the same temperature through emissivity e, the thermal radiance u of a material at a given wavelength 2 is a function of its emissivity e and its temperature T, given as:

$$u(\lambda) = f_1(e, T)$$

These relationships are well documented in the art. Given in another form, for a known wavelength λ:

$$T = f_2(e, u)$$

Thus, since the pixel intensity is a value that represents the thermal radiance u, if the emissivity e is known, or at least approximated with sufficient accuracy, the temperature can be determined from the pixel intensity. Conversely, if the temperature of the part of the material represented by a pixel having a given pixel intensity is known, or at least approximated with sufficient accuracy, the emissivity (or at least a sufficiently accurate approximation) can be determined:

$$e = f_3(T, u)$$

The emissivity is only weakly dependent on temperature, and so an emissivity determined for a particular temperature can be assumed to be valid over a relatively broad range of temperatures. Thus, in one embodiment, variations in emissivity with temperature may be ignored and the emissivity may be assumed constant. In other embodiments, since it is known that pixel intensity correlates with temperature, if the material is known, the calculated emissivity may be used as a starting point to determine an initial temperature estimate based on the pixel intensity and then the temperature estimate may be refined by recalculating the emissivity using the initial temperature estimate and the known relationship between emissivity and temperature for that material. Such calculations are within the capability of one skilled in the art, now informed by the present disclosure.

The molten material pixels M, and in particular the subset of molten material pixels M that are relatively close to the solidified boundary pixel set, can be assumed to be approximately at the liquidus temperature. The intensity u for the molten material pixels M, and preferably for the subset of pure metal (or alloy) pixels $M_m$, can be observed and then the emissivity $e_m$ for the material in the molten state can be determined, using the definite liquidus temperature as the value for T. Thus, at optional step 314, the method 300 uses the subset of the molten material pixels M having the definite liquidus temperature assigned thereto to determine a calculated molten material emissivity $e_m$. Step 314 is optional because, while it is useful to know the emissivity $e_m$ for the material in the molten state for other reasons, as noted above it is not strictly necessary to determine the emissivity $e_m$ for the material in the molten state in order to obtain provide thermal calibration for obtaining a cooling profile. Only the emissivity $e_s$ of the substrate material in its solidified state is necessary for a sufficient thermal calibration to extract a cooling profile.

Similarly, the solidified material pixels S that are adjacent to and outside of the melt pool (and any melt pool boundary region) can be assumed to be approximately at the solidus temperature. So, the intensity u for the solidified material pixels S can be observed, and, using the definite solidus temperature as the value for T, a very reasonable estimate of the emissivity $e_s$ of the substrate material in its solidified state can be obtained. Accordingly, at step 316 the method 300 uses the subset of the solidified boundary pixel set having the definite solidus temperature assigned thereto determine a calculated solid material emissivity $e_s$. The calculated solid material emissivity $e_s$ need not be the exact solid material emissivity to be sufficiently accurate for pseudocalibration.

At step 318, the method 300 uses the calculated solid material emissivity $e_s$ to calculate temperature values of the solidified material pixels. Using the estimate of the emissivity $e_s$, for any arbitrary solidified material pixel in the thermal image, the pixel intensity (using the known relationship among pixel intensity (as a proxy for radiance) and emissivity, can be used to determine an associated temperature T. This thermal calibration can then be applied to a single thermal image in the context of the method 100 shown in FIG. 1.

Step 318 optionally uses the calculated molten material emissivity $e_m$ to calculate temperature values of the molten material pixels by:

$$T = f_2(e_m, u)$$

Also optionally, if the type of impurities represented by the impurity pixels Ms are known (e.g. silicates) it may be possible to determine an emissivity for these foreign materials as well.

Although the melt pool 330 was described above in the context of a welding process, a melt pool may also result from melting of material in an additive manufacturing process or other heating process, and the method 300 is not limited to welding applications but may be applied to any heating process that produces a melt pool.

With the calculated solid material emissivity $e_s$ known, it becomes possible to apply the method 100 of FIG. 1 to a single thermal image, even from an uncalibrated thermal camera, to create a temperature profile of the cooling substrate material (e.g. a cooling weld bead or cooling deposition layer of material in additive manufacturing), along a path either determined automatically or supplied by the user, using:

$$T=f(e,u)$$

Figure 5:
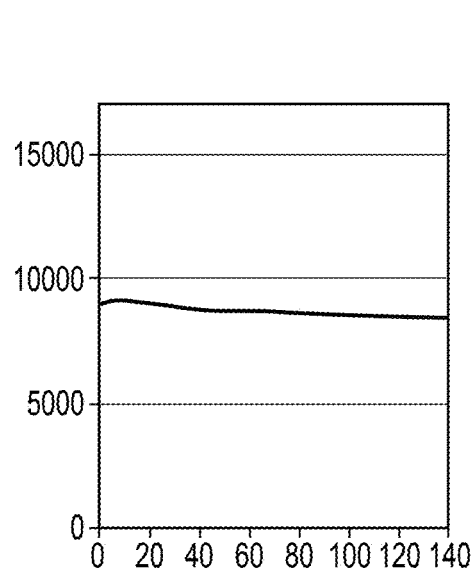
FIG. 5 shows an illustrative visualization of pixel intensity over a linear path.
Figure 5:
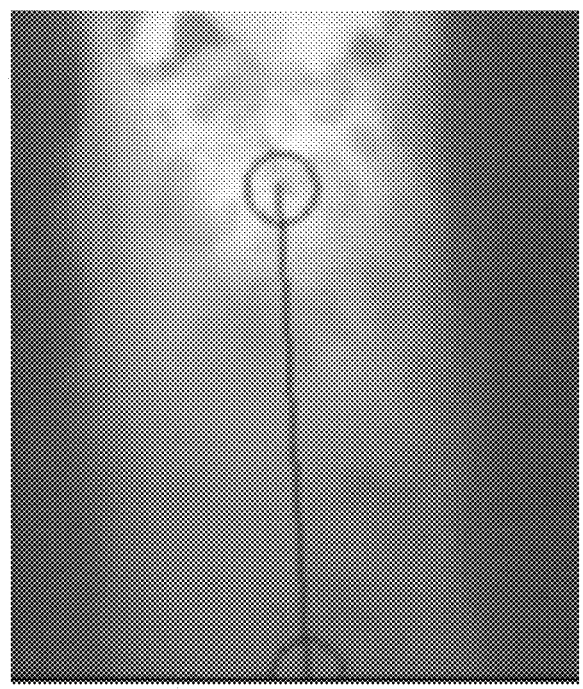

This temperature profile is valuable, for example, in allowing operators to better monitor their heating process. FIG. 5 shows an illustrative visualization of pixel intensity over a linear path.

Figure 6:
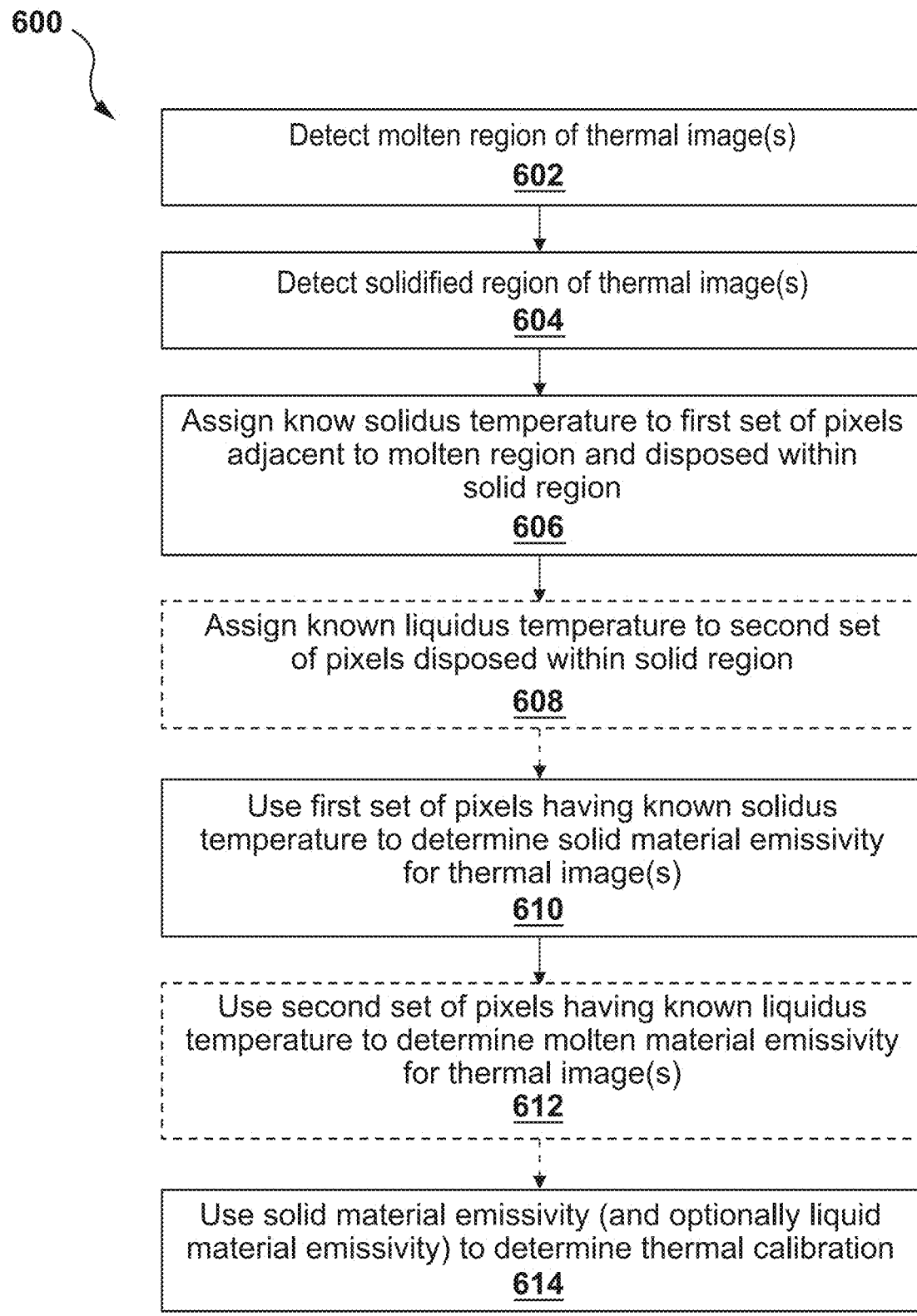
FIG. 6 is a flow chart which shows a method for calibrating at least one thermal image from an uncalibrated thermal camera.

Thus, one aspect of the disclosure is directed to a pseudo-calibration method, that is, a method for calibrating a thermal image from an uncalibrated thermal camera. Broadly speaking, if the material being imaged has a definite solidus (and optionally liquidus) temperature (melting point in the case of a pure metal) it is possible to determine the emissivity of the molten and just-solidified portions of the thermal image. While certain particular illustrative implementations of this method have been described above, the method is not limited to those implementations, and may be implemented in other ways as well. An overview of the method, of which the above-described implementations are merely illustrative, will now be described with reference to FIG. 6, in which the method is indicated generally by reference 600. The method is applied using one or more thermal images of a heating process using a material having a definite solidus temperature and a definite liquidus temperature. As noted above, the material may be an alloy in which the solidus and the liquidus are different, or may be a pure metal for which the solidus and the liquidus are subsumed in a single melting point.

At step 602, the method 600 detects a molten region of the at least one thermal image where the material is in a molten state, and at step 604 the method 600 detects a solidified region of the at least one thermal image where the material is in a solid state. The detection may be carried out using the methods described above, or using other techniques, for example by applying machine learning to recognize the molten region and the solidified region. Steps 602 and 604 may be carried out in reverse order or substantially simultaneously.

At step 606, the method 600 assigns the definite solidus temperature to a first set of pixels that are proximal to the molten region and disposed within the solid region, and at optional step 608, the method 600 assigns the definite liquidus temperature to a second set of pixels that are disposed within the molten region. Steps 606 and 608 may be carried out in reverse order or substantially simultaneously; moreover, steps 602, 604, 606 and 608 may be carried out in any order in which step 604 precedes step 606, and step 602 precedes optional step 608. Step 608 is optional because the calculated molten material emissivity is not necessary to obtain the required thermal calibration, as noted above. Additionally, where the material is a pure metal with a single melting point, steps 606 and 608 may be combined as the single melting point is assigned to both sets of pixels.

At step 610, the method 600 uses the first set of pixels having the definite solidus temperature assigned thereto to determine a calculated solid material emissivity for the thermal image. At optional step 612, the method 600 uses the second set of pixels having the definite liquidus temperature assigned thereto to determine a calculated molten material emissivity for the thermal image (again, the calculated molten material emissivity is not necessary to obtain the required thermal calibration). Steps 610 and 612 may be carried out in reverse order or substantially simultaneously; steps 602, 604, 606, 608, 610 and 612 may be carried out in any order in which step 604 precedes step 606 and step 606 precedes step 610, and in which step 604 precedes step 608 and optional step 608 precedes optional step 612.

At step 614, the method 600 uses the calculated solid material emissivity, and optionally the calculated molten material emissivity, to determine a thermal calibration.

As can be seen from the above description, the presently described calibration method and method for measuring a cooling rate of molten material each represent significantly more than merely using categories to organize, store and transmit information and organizing information through mathematical correlations. These methods are in fact an improvement to the technology of heating processes (including but not limited to welding), and particularly heating process imagery and analytics, as they provide for the use of thermal images from an uncalibrated thermal camera. This avoids the need for direct calibration of the thermal camera. Moreover, the methods are applied by using a particular machine, namely a thermal camera adapted to heating process imagery. As such, the present methods are confined to heating process imaging applications.

The present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, other programmable data processing apparatus, or other devices to function in a particular manner, such that the instructions stored in the computer readable storage medium produce an article of manufacture including instructions which implement aspects of the functions/acts specified in the flowchart and/or block diagram block or blocks. The computer readable program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
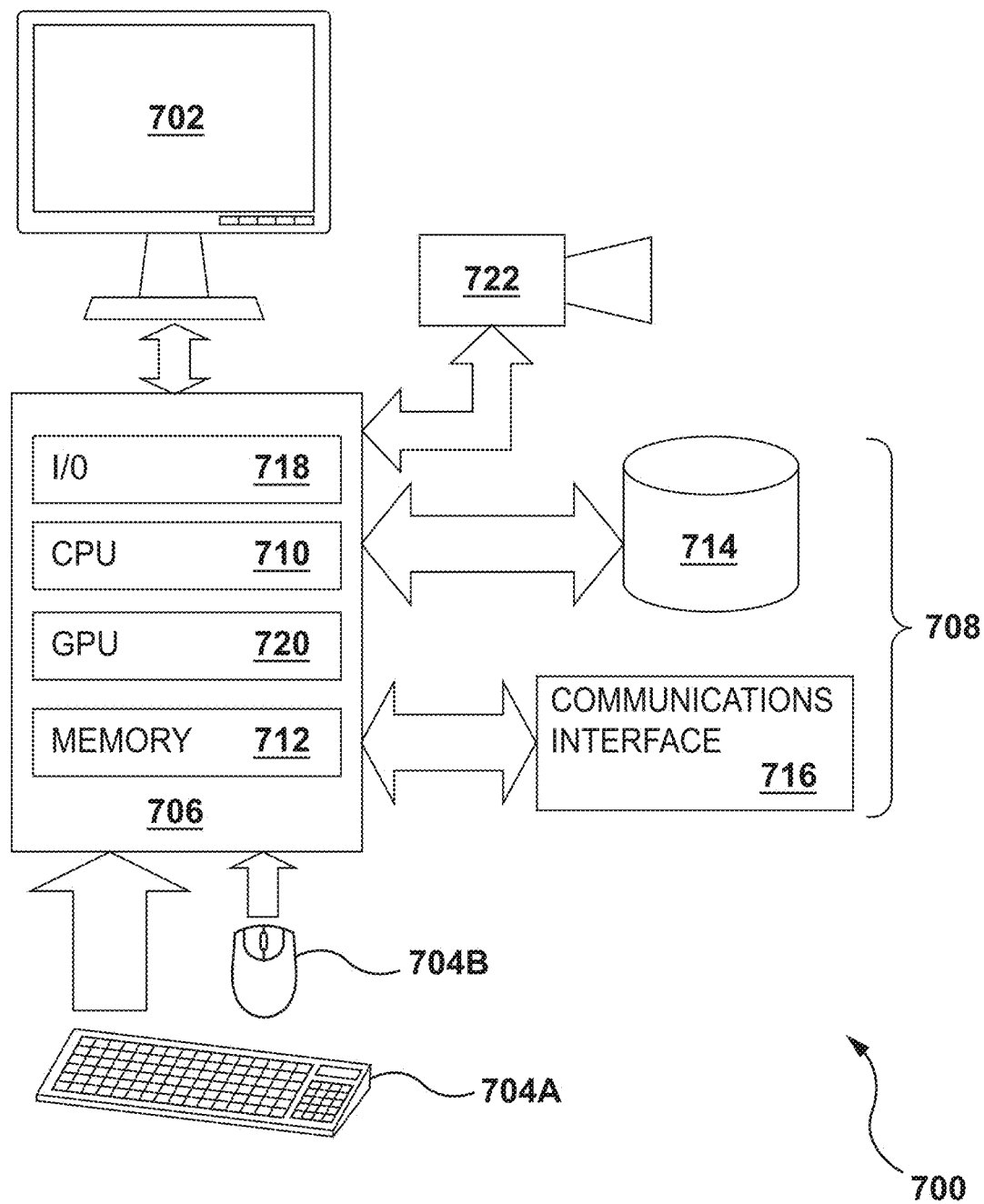
FIG. 7 is an illustrative computer system which may be used to implement aspects of the present technology.

An illustrative computer system in respect of which the technology herein described may be implemented is presented as a block diagram in FIG. 7. The illustrative computer system is denoted generally by reference numeral 700 and includes a display 702, input devices in the form of keyboard 704A and pointing device 704B, computer 706 and external devices 708. While pointing device 704B is depicted as a mouse, it will be appreciated that other types of pointing device, or a touch screen, may also be used.

The computer 706 may contain one or more processors or microprocessors, such as a central processing unit (CPU) 710. The CPU 710 performs arithmetic calculations and control functions to execute software stored in an internal memory 712, preferably random access memory (RAM) and/or read only memory (ROM), and possibly additional memory 714. The additional memory 714 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 714 may be physically internal to the computer 706, or external as shown in FIG. 7, or both.

The computer system 700 may also include other similar means for allowing computer programs or other instructions to be loaded. Such means can include, for example, a communications interface 716 which allows software and data to be transferred between the computer system 700 and external systems and networks. Examples of communications interface 716 can include a modem, a network interface such as an Ethernet card, a wireless communication interface, or a serial or parallel communications port. Software and data transferred via communications interface 716 are in the form of signals which can be electronic, acoustic, electromagnetic, optical or other signals capable of being received by communications interface 716. Multiple interfaces, of course, can be provided on a single computer system 700.

Input and output to and from the computer 706 is administered by the input/output (I/O) interface 718. This I/O interface 718 administers control of the display 702, keyboard 704A, external devices 708 and other such components of the computer system 700. The computer 706 also includes a graphical processing unit (GPU) 720. The latter may also be used for computational purposes as an adjunct to, or instead of, the (CPU) 710, for mathematical calculations. A thermal camera 722 is coupled to the computer system 700 to provide one or more thermal images to the computer system 700.

The various components of the computer system 700 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems. For example, a thermal camera may include an onboard computer system adapted to implement the methods described herein.

Thus, computer readable program code for implementing aspects of the technology described herein may be contained or stored in the memory 712 of the computer 706, or on a computer usable or computer readable medium external to the computer 706, or on any combination thereof, or on an onboard computer system of a thermal camera.

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

One or more currently preferred embodiments have been described by way of example. It will be apparent to persons skilled in the art that a number of variations and modifications can be made without departing from the scope of the claims. In construing the claims, it is to be understood that the use of a computer (including without limitation a thermal camera having an onboard computer system) to implement the embodiments described herein is essential.

What is claimed is:

1. A heating process method comprising:
applying heat to a substrate using a heat tool that is moving relative to the substrate,
receiving, by at least one processor of a computer system, a single thermal image of a weld bead on the substrate, wherein the single thermal image captures a temperature gradient along the weld bead resulting from a relative motion between the weld bead and the heating tool;
identifying, by the at least one processor, within the single thermal image:
a first pixel set in the weld bead having a first pixel set intensity corresponding to a first temperature $T_1$;
a second pixel set in the weld bead having a second pixel set intensity corresponding to a second temperature $T_2$; and;
determining, by the at least one processor, a pixel distance between the first pixel set and the second pixel set;
determining, by the at least one processor, a cooling rate of the weld bead based on using the first temperature $T_1$, the second temperature $T_2$, a known pixel speed of the substrate relative to the heat tool measured in pixels per unit time, and the pixel distance between the first pixel set and the second pixel set in the single thermal image to determine, wherein the cooling rate represents a time for the weld bead to cool from the first temperature $T_1$ to the second temperature $T_2$, wherein the heating process is monitored based on the determined cooling rate to evaluate the substrate; and
adjusting a parameter of the heating process based on the cooling rate.

2. The heating process method of claim 1, wherein the cooling rate of the weld bead is determined by the at least one processor independently of knowledge of an actual speed of movement of the substrate relative to the heat tool.

3. The heating process method of claim 1, wherein:
the heating process is a welding process; and
the heat tool is a welding torch.

4. The heating process method of claim 1, wherein the known pixel speed is determined by the at least one processor by:
receiving a time series of thermal image frames of the weld bead on the substrate, wherein each of the thermal image frames has a known time position in the time series;
detecting a feature in an earlier one of the thermal image frames;
detecting the feature in a later one of the thermal image frames;
determining a travel distance for the feature, measured in pixels, between the earlier one of the thermal image frames and the later one of the thermal image frames; and
using the known time position of the earlier one of the thermal image frames, the known time position of the later one of the thermal image frames, and the travel distance to determine the pixel speed.

5. The heating process method of claim 4, wherein:
the time series has a known frame rate; and
the known time position of the earlier one of the thermal image frames and the known time position of the later one of the image frames are determined by the at least one processor from the frame rate and a frame difference between the earlier one of the thermal image frames and the later one of the image frames.

6. The heating process method of claim 5, wherein the frame rate is a constant frame rate.

7. The heating process method of claim 4, wherein:
a timestamp is associated with each of the thermal image frames; and
the known time position of the earlier one of the thermal image frames and the known time position of the later one of the image frames are determined by the at least one processor from the respective timestamps associated with each of the earlier one of the thermal image frames and the later one of the image frames.

8. The heating process method of claim 1, further comprising applying, by the at least one processor, thermal calibration to the single thermal image.

9. The heating process method of claim 8, wherein the thermal calibration applied to the single thermal image is determined by the at least one processor by:
receiving at least one reference thermal image of a same material as depicted in the thermal image of the weld bead on the substrate, the at least one reference thermal image and including a melt pool of the material and a proximal solidified region of the material, wherein the at least one reference thermal image is obtained by a same thermal camera as obtained the single thermal image;
identifying the melt pool, wherein the melt pool contains molten material pixels;
identifying at least a solidified boundary pixel set, wherein the solidified boundary pixel set contains solidified material pixels that are proximal to and outside of the melt pool, wherein the material has a definite solidus temperature;
assigning the definite solidus temperature to a subset of the solidified boundary pixel set;
using the solidified boundary pixel set having the definite solidus temperature assigned thereto to calculate solid material emissivity; and
using the calculated solid material emissivity to calculate temperature values of the solidified material pixels.

10. The heating process method of claim 9, wherein the definite solidus temperature is determined thermodynamically.

11. The heating process method of claim 9, wherein the definite solidus temperature is a kinetically adjusted solidus temperature.

12. The heating process method of claim 9, further comprising, for the at least one reference thermal image:
wherein the material has a definite liquidus temperature;
assigning, by the at least one processor, the definite liquidus temperature to a subset of the molten material pixels; and
using, by the at least one processor, the subset of the molten material pixels having the definite liquidus temperature assigned thereto to determine a calculated molten material emissivity; and
using, by the at least one processor, the calculated molten material emissivity to calculate temperature values of the molten material pixels.

13. The heating process method of claim 9, wherein:
the at least one reference thermal image is a time series of thermal image frames; and
identifying the melt pool comprises:
detecting, by the at least one processor, a plurality of fluctuating pixels wherein the fluctuating pixels fluctuate between higher and lower apparent thermal values over the time series;
determining, by the at least one processor, a boundary subsuming a threshold spatial density of the fluctuating pixels; and
setting, by the at least one processor, the boundary as a melt pool boundary containing the melt pool.

14. The heating process method of claim 13, wherein determining the boundary comprises applying, by the at least one processor, a brightness threshold to the fluctuating pixels and excluding those of the fluctuating pixels that fail to satisfy the brightness threshold.

15. The heating process method of claim 12, wherein the material is an alloy and the solidus temperature and the liquidus temperature are different.

16. The heating process method of claim 12, wherein the material is a pure metal and the solidus temperature and the liquidus temperature are subsumed in a single melting point.

17. The heating process method of claim 1, wherein the parameter of the heating process is movement of the heat tool relative to the substrate.

18. A heating control system, comprising:
a thermal camera to provide a single thermal image of a weld bead on a substrate in a heating process, wherein the single thermal image captures a temperature gradient along the weld bead resulting from a relative motion between the substrate and a heat tool;
a computer system coupled to the thermal camera, the computer comprising at least one processor and memory coupled to the at least one processor, the memory containing instructions for causing the at least one processor to:
receive the single thermal image of the weld bead on the substrate in the heating process;
identify within the single thermal image:
a first pixel set in the weld bead having a first pixel set intensity corresponding to a first temperature $T_1$; and
a second pixel set in the weld bead having a second pixel set intensity corresponding to a second temperature $T_2$;
determine a pixel distance between the first pixel set and the second pixel set;
determine a cooling rate of the weld bead based on using the first temperature $T_1$, the second temperature $T_2$, a known pixel speed of the substrate relative to the heat tool measured in pixels per unit time, and the pixel distance between the first pixel set and the second pixel set in the single thermal image, wherein the cooling rate represents a time for the weld bead to cool from the first temperature $T_1$ to the second temperature $T_2$;
monitor heating of the substrate by the heating tool based on the determined cooling rate; and
adjust a parameter of the heating process based on the cooling rate.

19. The heating control system of claim 18, wherein the parameter of the heating process is movement of the heat tool relative to the substrate.

20. The heating process method of claim 1, wherein the weld bead is a cladding bead.

21. The heating process method of claim 1, wherein the weld bead is a brazing bead.

22. The heating process method of claim 1, wherein the known pixel speed is determined from a time series of thermal images.

* * * * *